May 28, 1935.  M. W. GIESKIENG  2,002,942

TELEPHONY

Filed Dec. 13, 1929

Inventor

Marion W. Gieskieng.

A. J. O'Brien

Attorney

Patented May 28, 1935

2,002,942

UNITED STATES PATENT OFFICE 2,002,942

TELEPHONY

Marion W. Gieskieng, Denver, Colo., assignor, by direct and mesne assignments, to Radio Corporation of America, New York, N. Y., a corporation of Delaware Application December 13, 1929, Serial No. 413,757

11 Claims. (Cl. 179—78)

This invention relates to improvements in methods and apparatus for transmitting intelligence by electrical means and has reference more particularly to a method and an apparatus for reducing or minimizing the effect of static and other line noises and disturbances.

In my copending application Serial No. 407,974, filed November 18, 1929, now Patent No. 1,937,754, issued December 5, 1933, I have shown and described a system for the transmission of electrical waves and for the transformation of such waves into sound waves wherein suitable means is provided for distorting the signal at the sending station in such a way that the weaker waves are transmitted stronger in proportion than the stronger ones and which is provided at the receiving end with means for demodulating the waves in such a way as to correct for the distortion produced at the sending end, and in this way the sound waves are reproduced without distortion while static or other electrical disturbances that are picked up between the sending and the receiving stations are greatly reduced.

In the application above identified the sound waves are first transformed into electrical waves by means of a vibrating beam of light and a photo-electric cell. The beam of light is vibrated by a diaphragm that moves in response to the sound waves and is caused to move over an opening in a shield that is interposed between the mirror and the photo-electric cell and this causes a variation in the light intensity within the cell which, in turn, sets up a variable current that is amplified and transmitted in the usual manner. At the receiving station, the variable electric current operates a sensitive galvanometer that is made to vibrate in accordance with the variations in the current and which controls a mirror that in turn controls a beam of light that is directed towards another photo-electric cell, and which, in order to enter the cell must first pass through a window in a shield. The windows or openings in the shields at the sending and at the receiving stations are so formed that their width varies in such a manner that when a narrow beam of light is caused to move longitudinally of the openings, the amount of light that passes through the opening will vary with the position of the beam and not in accordance with the amplitude of vibrations of the light beams. The opening in the shield at the sending end is so designed that the weaker signals or vibrations produce a greater effect on the photo-electric cell in proportion than the stronger ones and the opening in the shield at the receiving end is constructed so that it will correct the distortion produced by the apparatus at the sending end.

With the apparatus described in my application above identified, a photo-electric cell is used at the receiving end as well as at the sending end and this serves to slightly increase the cost of the apparatus and also makes it more complicated and more sensitive to injury than if the reception were effected by means of thermionic tubes.

It is an object of this invention to produce an apparatus in which the photo-electric cell at the receiving end of the transmitting circuit shown in my application above identified shall be replaced by a receiving circuit having thermionic tubes arranged in a well known manner and in which the plate current characteristic shall be so biased that the incoming signals will be distorted to the same extent but in the opposite direction to the distortion given them at the sending end.

It is well known that the response curve or the grid voltage plate current characteristic curve of a thermionic amplifier has its opposite ends inclined at a comparatively small angle with the horizontal axis and has the two ends connected by a portion that is substantially straight. Where a distortionless transmission and reproduction is desired, the grid is biased so that the grid voltage variations will swing to opposite sides of the line bisecting the straight portion of the curve. If the end portions of the characteristic curve are employed, the signals will be distorted which is objectionable with the usual transmission apparatus.

I have found that if I substitute for the reception apparatus shown in my copending application, a push-pull amplifying circuit employing two thermionic tubes and bias the grid in such a way that the lower part of the characteristic curve will be used in the operation, the incoming signals that have been distorted by the sending apparatus can be demodulated so as to be reproduced in exactly the form in which they would have to be to correspond with the sound waves.

In order to more clearly describe my invention so that the operation thereof can be readily understood, reference will be had to the accompanying drawing in which the preferred embodiment thereof has been illustrated and in which.

Figure 1:
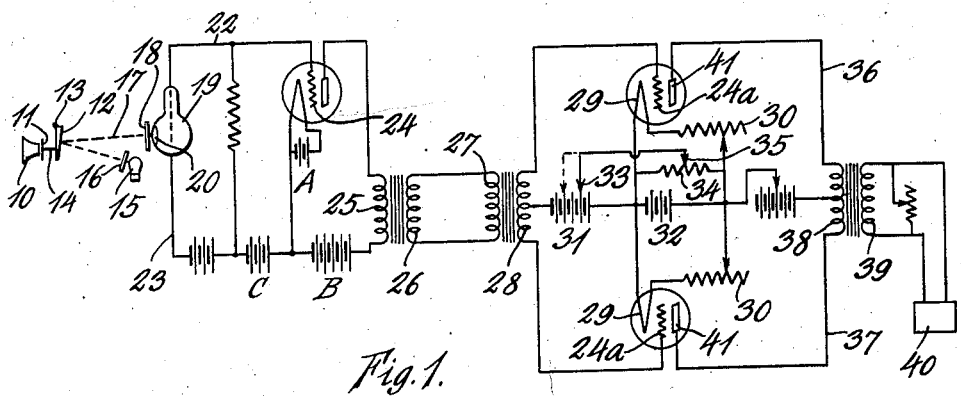
Fig. 1 is a circuit showing in a diagrammatic way my improved sending and receiving apparatus connected for one way transmission.
Figure 5:
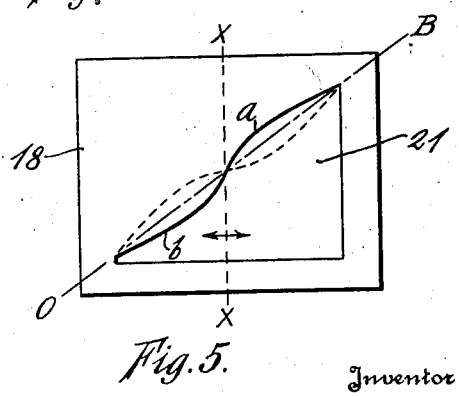
Fig. 5 is a view showing one form of opening employed in the screen at the sending end.

In Fig. 1 the transmitter has been designated by reference numeral 10 and the diaphragm by 11. A mirror 12 is pivoted at 13 and is connected with the diaphragm by means of a rigid member 14 and therefore whenever the diaphragm is vibrated in response to sound waves, the mirror will be rotated about its axis. A source of light, which may be a lamp 15, is located in the vicinity of the mirror and is shielded from the latter by an opaque member 16 having a slot through which a beam of light may pass. The reflected portion of this light beam has been designated by reference numeral 17 and this moves over an opaque shield 18 like that shown in Fig. 5. Located on the other side of shield 18 is a photo-electric cell 19, whose window 20 is placed directly back of the opening 21 in shield 18. When the beam of light 17 is vibrated, it will swing over the opening 21 in the direction indicated by the double headed arrow in Fig. 5. As the narrow light beam so to speak, always overlaps the opening 21, the amount of light that passes through this opening and into the photo-electric cell will depend on the position that the beam has with respect to the opening. The parts are adjusted so that the beam of light will normally vibrate equal distances on opposite sides of the line $x$—$x$ and therefore the smaller vibrations will have a greater proportionate effect than the larger ones owing to the fact that the inclination of the curve is the largest at this point. The variable electric current that is set up in conductors 22 and 23 due to the variations of the light intensity in the photo-electric cell will cause a corresponding variation in the voltage of grid 24 and this in turn will produce a corresponding current variation in the primary 25 of the transformer. In the sending circuit the grid is biased so that the straight portion of the characteristic curve is employed, and therefore any distortion will correspond to that produced by the curvature of the upper edge of the opening 21. The variable current in the primary 25 will set up a corresponding current in the secondary 26 and this will flow through the primary coil 27 at the receiving station and set up a correspondingly variable current in the secondary 28, which in turn will vary the voltage of the grids 24a. The grids 24a are biased to zero and therefore the grid voltage will vary so that it will be both greater and less than the voltage of the filament, and therefore each of the two thermionic tubes will become rectifiers that transmit one-half of the current impulses only. The fact that the lower ends of the characteristic curves are employed means that the shape of the current waves that flow in the plate circuit will be distorted and if care is taken to select a part of the characteristic curve that corresponds in shape to the curves $a$ and $b$ of the upper side of the opening 21, it is possible to distort the current waves to the same amount, but in opposite directions to the distortion effected at the sending end and thereby obtain a current that corresponds exactly with the form of the sound waves or other signals.

Figure 4:
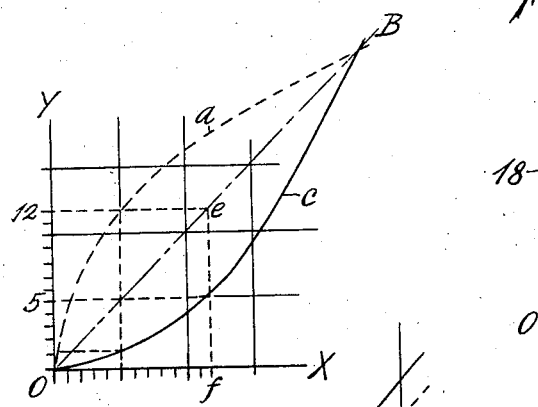
Fig. 4 is a diagram showing the relationship between the shape of the window in the screen at the sending end and the characteristic curve at the thermionic tube at the receiving end.

In Fig. 4 I have shown a diagram in which the curve $a$ that represents the corresponding curved portion of opening 21 has been indicated by a dotted line. The curve $c$ which is shown by a full line represents the lower part of the characteristic curve of the amplifying tube. Curves $a$ and $c$ are symmetrical with respect to a straight line O—B.

Let us now consider that the beam of light 17 is vibrated to the point designated by reference numeral 5 on line O—Y. If the upper edge of opening 21 were a straight line inclined as indicated by line O—B then the effect on the photoelectric cell would correspond exactly with the position of the beam, but since opening 21 is curved along line $a$ twelve units of light will enter the cell instead of five, and this will therefore be equivalent to an amplitude of vibration that would bring the beam to the position designated by line $e$—$f$. If the electrical impulses that arrive at the receiving station were amplified by tubes in which the straight line portion of the characteristic curves were used, the reproduced sounds or signals would be distorted, but, by utilizing the lower portions of the characteristic curves, and by so adjusting the bias on the control grid of the tube that the curvature corresponds to that of the corresponding curves in the edge of the opening 21, the distorted signal is reduced to the same amount to which it was increased by means of the curved opening 21 and the resultant current will therefore correspond exactly with the sound vibrations. Any static or line disturbances that are picked up between the sending and the reproducing stations are subjected to reduction and therefore if a disturbance that would be equivalent to five units of light is picked up, this will be reduced at the receiving apparatus so that its effect will be less than that of two units of light and in this way the undesirable disturbing factors will be decreased, while the signals will be reproduced at their original values.

Figure 3:
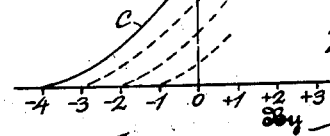
Fig. 3 is a diagram showing the grid voltage plate current characteristic of an ordinary thermionic tube and shows the manner in which the shape of this curve can be varied by varying the B and C battery voltages.

In Fig. 3 the characteristic curve has been shown by a solid black line and the dotted lines show how the shape of this curve can be varied by varying the B and C battery voltages applied to the vacuum tubes and it is evident therefore that by means of such voltage variation, the correcting effect can be adjusted so as to get the best results.

In Fig. 1 I have indicated an ordinary push-pull receiving circuit having two thermionic tubes. The filaments 29 instead of being directly connected to a battery have their terminals provided with resistances 30 that can be varied so as to make it possible to very correctly adjust the voltage of the filaments and the amount of current that flows through them. The grids 24a are supplied with voltage from batteries 31 and 32 in the manner shown and a variable connection 33 is provided which permits a greater or less amount of cells of the battery 31 to be connected, and in order to obtain still finer adjustment the battery 32 is provided with a shunt 34 over which a movable contact 35 moves. By means of the potentiometer (34 and 35) very fine adjustments can be effected. The plate currents pass through wires 36 and 37 to the primary coil 38 of the transformer whose secondary 39 is connected with the reproducer 40. The grids 24a are biased to zero as above explained and therefore each of the two thermionic tubes will pass one-half of the alternations in a manner well understood and since only the lower parts of the characteristic curves are used, the electrical waves will be modulated in the opposite direction and to the same extent as they have been modulated at the transmitting end thereby produce in the secondary 39 currents that correspond exactly with the shape of the sound waves that are being transmitted. Any disturbance such as static or line noises will be decreased only, as they are not subjected to any distortion at the sending end and therefore their effect will be decreased in comparison with the signal.

Figures 2, 6:
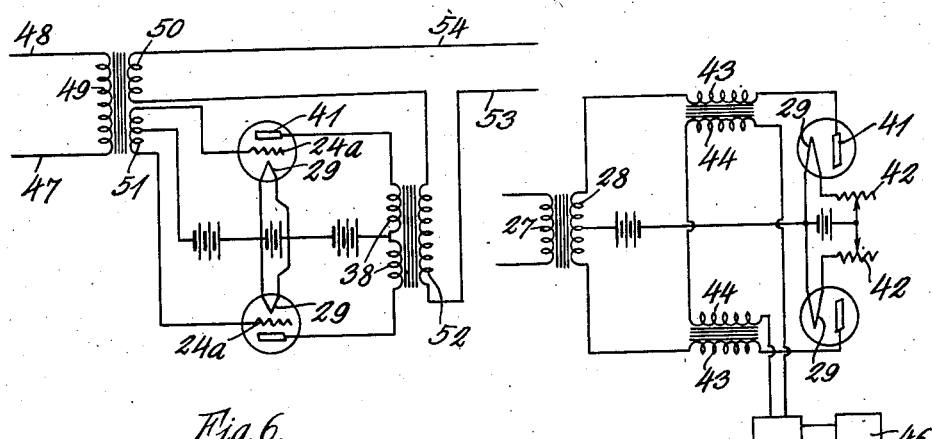
Fig. 2 is a diagrammatic representation of a slightly modified form of reception circuit.
Fig. 6 shows a circuit that can be substituted for the sending circuit shown in Fig. 1.

In Fig. 2 I have shown how the same effects may be produced with tubes having two electrodes instead of with three electrode tubes shown in Fig. 1. The tubes shown in Fig. 2 have each a filament 29 and a plate 41. The filaments are energized by a battery and have a variable resistance 42 interposed between one terminal of the battery and one terminal of the filaments so that fine adjustment can be made. The two ends of the secondary 28 are each connected with one of the plates 41 and the connections comprise primary coils 43. The secondaries 44 are connected in series and are connected with an amplifier unit 45, which, in turn is connected with a reproducer 46. Since the characteristic curves of a two electrode thermionic tube is substantially the same as the characteristic of a three electrode tube, the same distortion effect can be produced by the arrangement shown in Fig. 2 as with the arrangement shown in Fig. 1.

In Fig. 6 I have shown a transmission unit that can be substituted for the one shown in Fig. 1 and which does not employ a photo-electric cell. The conductors 47 and 48 represent the two sides of a telephone circuit and are connected by means of a primary winding 49. Inductively related to the winding 49 are two secondaries 50 and 51. The secondary 51 comprises a smaller number of turns than the secondary 50 and corresponds to the secondary 28 of Fig. 1. The ends of secondary 51 are connected with the grids 24a and the plates 41 are connected with the primary windings 38. A secondary winding 52 which is in series with the secondary winding 50 is inductively related to the primary winding 38 in Fig. 6, and the parts are so connected that the voltages set up in secondaries 50 and 52 are opposed. The voltage generated by secondary 52 is smaller than that generated in secondary 50 but is distorted due to the fact that the tubes are operating on the lower portion of the characteristic curves and therefore the current that results and which flows in the line conductors 53 and 54 is distorted in substantially the same manner as the corresponding currents in the transmission line shown in Fig. 1. These distorted currents are then reformed at the receiving end by means of the receiving apparatus shown in Fig. 1, or like that shown in Fig. 2. It is therefore evident that the photo-electric cell shown in Fig. 1 can be dispensed with and substantially similar results obtained.

By using sufficient grid bias to obtain zero plate current and by having the secondary 52 connected in opposition to secondary 50 the output over lines 53 and 54 will be distorted and the weaker modulations will therefore be transmitted stronger in proportion than the stronger ones.

In the above description the invention has been explained in connection with the transmission and reproduction of sound, but it is also applicable to systems employed for transmitting pictures, telegraphic signals, or other means for conveying intelligence and the word "sound" should therefore be considered as illustrative only and not in a limiting sense.

In Fig. 1 I have shown a system in which a beam of light is vibrated by means of a mirror, but I wish it understood that the same or similar effects can be produced by means of a beam of cathode rays that is vibrated by means of an electromagnet energized by the sound waves and whenever a beam of light is referred to, it should be construed broadly enough to cover a beam of cathode rays as well and in fact any beam of light or other rays that can be used for effecting the operation of the photo-electric cell.

This invention is also very well adapted for use in connection with talking pictures as it can be effectively employed for recording the distorted sound waves and then reproducing them with a counter distorting device, thereby eliminating or at least to a large extent reducing the surface or stray noises that are always present to a greater or less extent in the sound tracts of the films.

The receiving circuit shown to the right of transformer 27 and 28 is useful in any telephone or wireless reception device, as it will automatically reduce and eliminate line disturbances such as static and reproduce the signals at their true value.

Having described the invention what is claimed as new is:

1. In a signalling system, a source of sounds, photoelectric means to convert the sounds into electrical variations in such a manner that weaker sounds are converted into greater variations in proportion than stronger sounds, means for transmitting the electrical variations through an interference zone, means for receiving transmitted electrical variations and interference impulses comprising a pair of multi-electrode electron discharge tubes having their input and output circuits connected in push pull, and means for biasing at least one of the electrodes of each tube to such a point on the grid voltage-anode current charactertistic of each tube that the received electrical variations are re-distorted in accordance with the original sounds and the interference impulses reduced.

2. In a signalling system, a source of sounds, means to convert the sounds into electrical variations comprising a pair of electron discharge tubes having their input and output circuits connected in push pull, the common output circuits of both tubes being coupled to their input circuits in such a manner that weaker sounds are converted into greater variations in proportion than stronger sounds, means for transmitting the electrical variations through an interference zone, means for receiving transmitted electrical variations and interference impulses comprising a pair of multi-electrode electron discharge tubes having their input and output circuits connected in push pull, and means for operating the last named tubes at such points on the anode current-grid voltage characteristic of each tube that the received electrical variations are re-distorted in accordance with the original sounds and the interference impulses reduced.

3. In a signalling system, a source of sounds, means to convert the sounds into electrical variations comprising a pair of electron discharge tubes having their input and output circuits connected in push pull, each tube being operated at the lower bend of its grid voltage-anode current characteristic and having their common output circuit coupled to their input circuit in such a manner that weaker sounds are converted into greater variations in proportion than stronger sounds, means for transmitting the electrical variations through an interference zone, means for receiving transmitted electrical variations and interference impulses comprising a pair of multi-electrode electron discharge tubes having their input and output circuits connected in push pull, and means for operating the last named tubes on their grid voltage-anode current characteristics in such a manner that the received electrical variations are re-distorted in accordance with the original sounds and the interference impulses reduced.

4. In a system for reducing interference effects upon signal transmissions, a source of signal energy, means for vibrating a beam of light in accordance with the signal energy, means for projecting said vibrating light beam upon a light sensitive element and transform said vibrations into representative current variations, means for controlling the projection to produce distorted representative current variations, means for transmitting the distorted current variations through an interference region, a receiving system including means for collecting the transmitted energy and interference energy, a de-distorting circuit having an input side and an output side, means for impressing the collected energy upon the input side of the circuit, said circuit comprising a pair of thermionic devices connected in push-pull, means for operating said two thermionic devices along curved portions of their respective grid voltage anode current characteristic curves whereby the collected energy is de-distorted to its original condition.

5. In combination a source of energy waves representative of energy to be reproduced, means for vibrating a beam of radiant energy in accordance with said waves, means for projecting said vibrating beam of radiant energy upon a radiant energy sensitive element, means for controlling the projection to produce predetermined distorted representative current variations, a de-distorting circuit having an input and an output side, means for impressing the distorted representative current variations across said input side, said circuit comprising a pair of thermionic devices each thereof biased at cut-off, said thermionic devices being operated along portions of their respective grid voltage anode current characteristic curves whereby the distorted energy impressed across the input circuit is de-distorted and transformed into currents representative of the energy to be reproduced, and a utilizing circuit coupled to said output side.

6. In a signalling system a source of signal energy, a transmission line, means for transferring a portion of the signal energy from the source to the transmission line comprising a coupling between said source and the transmission line, a second coupling between the source and the transmission line including a pair of electron discharge tubes provided with push-pull input and output circuits, said push-pull input circuit being coupled to said source of signal energy and through which coupling another portion of the signal energy is transferred from the source to said input circuit, means for coupling said push-pull output circuit to the transmission line in a sense so that the energy transferred from the source to the transmission line through the first named coupling opposes the energy transferred to the transmission line from the push-pull output circuit, said electron tubes being biased so as to operate along curved portions of their respective plate current grid voltage characteristic curves whereby the energy transferred from said push-pull output to the transmission line is distorted to the extent that weaker signal energy is less amplified in proportion than stronger signal energy.

7. In combination with a system as described in the next preceding claim, a de-distorting circuit having an input side and an output side, means for impressing the distorted energy in the transmission line across said input side said de-distorting circuit comprising a pair of thermionic devices each thereof biased so as to be operated along portions of their respective grid voltage anode current characteristic curves whereby the distorted energy impressed across the input circuit is, in effect, de-distorted and transformed into energy representative of the original signal energy and a utilizing circuit coupled to said output side.

8. In a signalling system a source of signal energy, means to convert the signal energy into equivalent electrical energy, a pair of electron discharge tubes having their input and output circuits connected in push-pull, means for transferring a portion of the electrical energy to the push-pull input circuit, each of said tubes being operated along a curved portion of its grid voltage plate current characteristic curve whereby the energy transferred thereto is distorted by said two tubes to the extent that the amplifying action of the tubes increases in a predetermined manner with increasing intensity of electrical energy transferred thereto, a transmission line, means for transferring another portion of the electical energy to the transmission line, means for coupling said push-pull output circuit to the transmission line to transfer thereto the distorted energy, said coupling being adapted to transfer said distorted energy in a sense to oppose the other energy transferred to the transmission line.

9. In combination with a system as described in the next preceding claim, a de-distorting circuit having an input side and an output side, means for impressing the distorted energy in the transmission line across said input side said de-distorting circuit comprising a pair of thermionic devices each thereof biased so as to be operated along portions of their respective grid voltage anode current characteristic curves whereby the distorted energy impressed across the input circuit is, in effect, de-distorted and transformed into energy representative of the original signal energy and a utilizing circuit coupled to said output side.

10. A system as described in claim 8 wherein the two couplings between the source and the transmission line are related so that the energy transferred to the transmission line from the direct coupling is always greater than the energy transferred to the transmission line from the source through the push-pull circuit.

11. In a system for reducing interference effects upon signal transmissions, a source of signal energy, means for distorting a portion of said signal energy to the extent that weaker signal energy is less amplified in proportion than stronger signal energy, means for combining the distorted energy with another portion of the signal energy in a sense so that the two energies tend to neutralize each other, means for transmitting the resultant energy, means for collecting the transmitted energy, a de-distorting amplifying circuit connected to the collecting means, said circuit being provided with means for amplifying the collected energy in such a way that the stronger the collected energy the greater in proportion is the energy amplified.

MARION W. GIESKIENG.